(12) United States Patent
Archibald

(10) Patent No.: US 7,765,952 B1
(45) Date of Patent: Aug. 3, 2010

(54) PET BED

(76) Inventor: Bob Archibald, 615 Poso St., P.O. Box 39, Maricopa, CA (US) 93252

( * ) Notice: Subject to any disclaimer, the term of this patent is extended or adjusted under 35 U.S.C. 154(b) by 78 days.

(21) Appl. No.: 11/602,894

(22) Filed: Nov. 20, 2006

(51) Int. Cl.
*A01K 29/00* (2006.01)
(52) U.S. Cl. .................................... 119/28.5
(58) Field of Classification Search ............... 119/28.5, 119/452, 482; 5/496, 499, 500
See application file for complete search history.

(56) References Cited

U.S. PATENT DOCUMENTS

| 1,879,473 | A | * | 9/1932 | Pitts | ............ 119/482 |
|---|---|---|---|---|---|
| 2,775,222 | A | | 12/1956 | Kruck | |
| D232,850 | S | | 9/1974 | Bloyd | |
| 3,842,454 | A | | 10/1974 | Young | |
| 3,989,008 | A | | 11/1976 | Neumann | |
| 4,729,343 | A | | 3/1988 | Evans | |
| 5,000,116 | A | | 3/1991 | Fife | |
| 5,136,981 | A | * | 8/1992 | Barreto et al. | ............ 119/28.5 |
| 5,749,314 | A | | 5/1998 | Pelham | |
| 6,644,245 | B2 | | 11/2003 | Haze | |

OTHER PUBLICATIONS

Internet Web Advertising—"Pet Street Mall" and "ebay" Oct. 30, 2004 & Nov. 5, 2004.

\* cited by examiner

*Primary Examiner*—Michael R Mansen
*Assistant Examiner*—Monica Williams
(74) *Attorney, Agent, or Firm*—Dennis W. Beech

(57) ABSTRACT

The present invention may be used by pets. A bed frame may have a side wall with an open portion with a door frame positioned and attached in the open portion. A bottom cover assembly may have a bottom cover with a side wall cover attached at a peripheral edge. The side wall cover may be positioned on the side wall when the bottom cover may be positioned under a bottom edge of the side wall. A bottom pad may be attached to the peripheral edge at a side open portion of the side wall cover. The bottom pad may be insertable through the door frame to be positioned in interior to the side wall when the bottom cover assembly may be positioned on the bed frame. A top cover assembly may have a cover portion with a bottom wall portion that may be positioned on the side wall cover exterior to the side wall. The top cover assembly may have a door frame portion positionable at a door frame strip on the door frame.

15 Claims, 3 Drawing Sheets

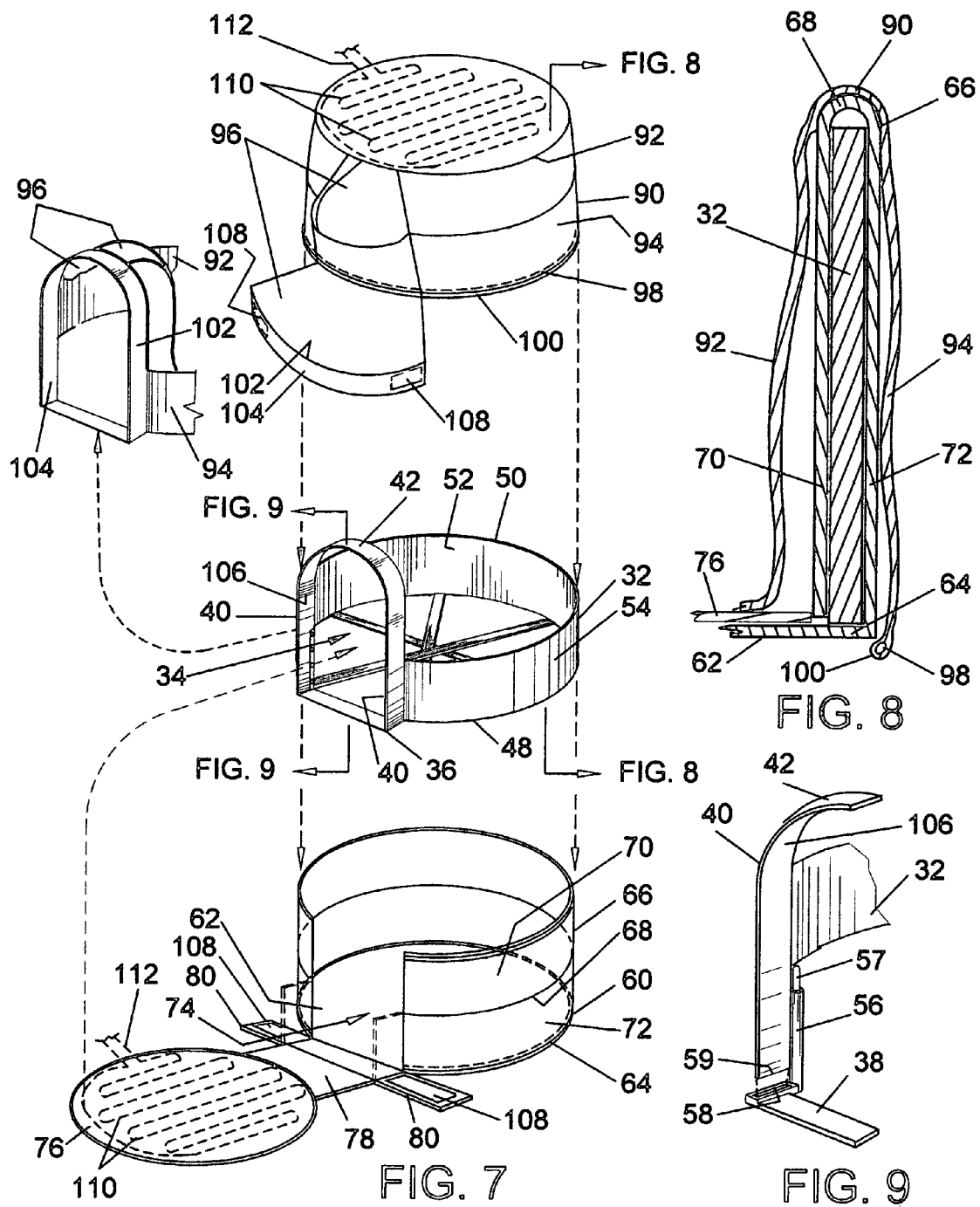

PET BED

BACKGROUND OF THE INVENTION

This invention relates to devices for use by pets, for example, dogs, cats and the like, for resting or sleeping, for warmth, and for security. The new device may have a rigid frame with a door or entrance frame, a removable pad or mattress, and a top or cover with a door portion for support on the entrance frame in an open position.

Pet beds, such as dog and cat beds, that have a cover fastened to the bed for an animal to crawl under may be currently in use. These pet beds may be in the form of a sleeping bag with no support structure to hold the entrance open. Other pet beds may have a raised and supported cover such that they resemble a cave and the cover may not rest on an animal when the animal is in the bed. Pet beds that may have a bottom and side walls with an opening may have a pad or mattress in a lower element and a second pad or cover supported on the upper edge of the side walls to form a bottom compartment and an upper pad area that is for an animal to lie down. Pet beds with a bottom and side walls may also have sleeping bag structures installed interior to the walls and may have a yoke to support an entrance to a sleeping bag in an open or closed position. Yet other beds may have a bottom pan with low vertical flanges on which a cover may be attached and may have an entrance frame to support the cover.

SUMMARY OF THE INVENTION

The present invention is directed to devices for use by pets. A bed frame may have a side wall with an open portion with a door frame positioned and attached in the open portion. A bottom cover assembly may have a bottom cover with a side wall cover attached at a peripheral edge. The side wall cover may be positioned on the side wall when the bottom cover may be positioned under a bottom edge of the side wall. A bottom pad may be attached to the peripheral edge at a side open portion of the side wall cover. The bottom pad may be insertable through the door frame to be positioned interior to the side wall when the bottom cover assembly may be positioned on the bed frame. A top cover assembly may have a cover portion with a bottom wall portion that may be positioned on the side wall cover exterior to the side wall. The top cover assembly may have a door frame portion positionable at a door frame strip on the door frame.

These and other features, aspects and advantages of the present invention will become better understood with reference to the following drawings, description and claims.

BRIEF DESCRIPTION OF THE DRAWINGS

FIG. 7 illustrates a perspective exploded view of a pet bed according to an embodiment of the invention;

FIG. 8 illustrates a partial side cross-section view of a pet bed according to an embodiment of the invention;

FIG. 9 illustrates a partial cross-section view of an entrance frame according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
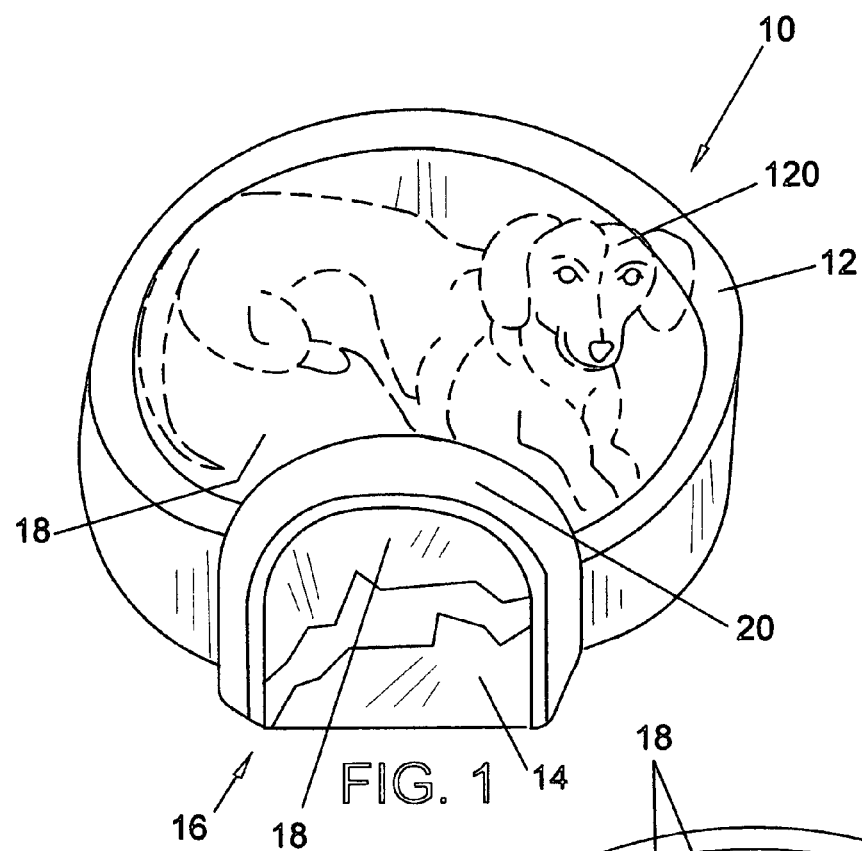
FIG. 1 illustrates a perspective view of a pet bed with a dog on the top cover according to an embodiment of the invention.
Figure 2:
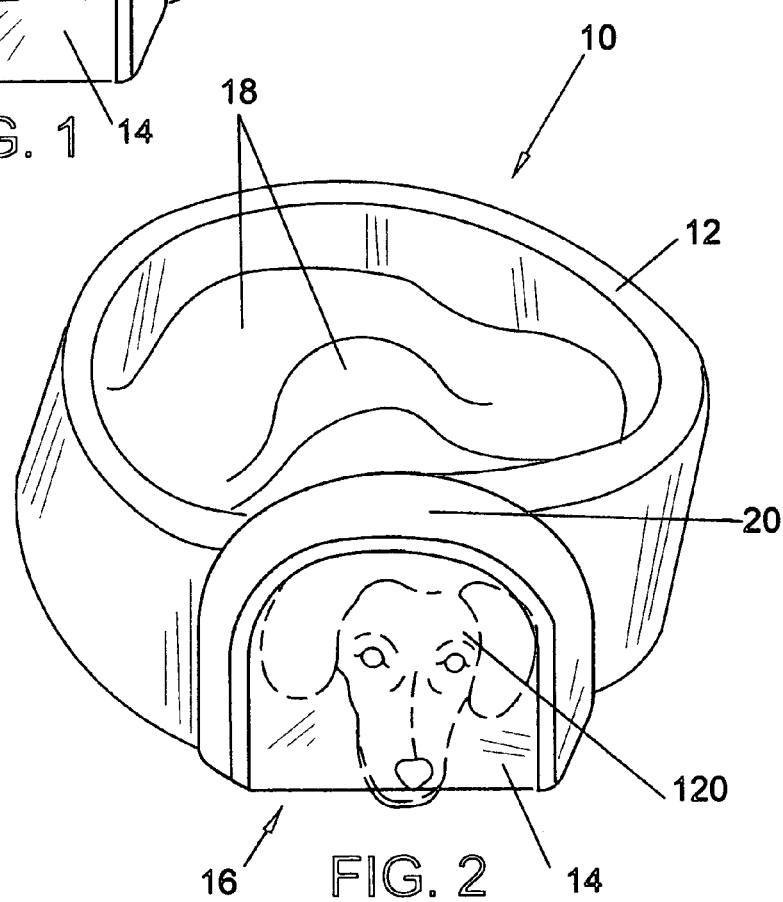
FIG. 2 illustrates a perspective view of a pet bed with a dog under the top cover according to an embodiment of the invention.
Figure 3:
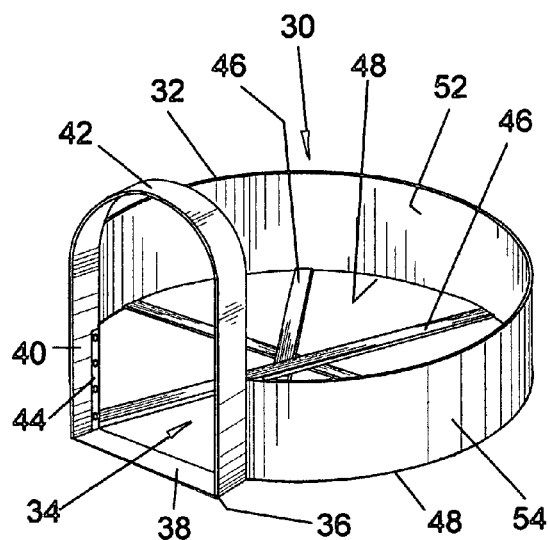
FIG. 3 illustrates a perspective view of a bed frame according to an embodiment of the invention.
Figure 4:
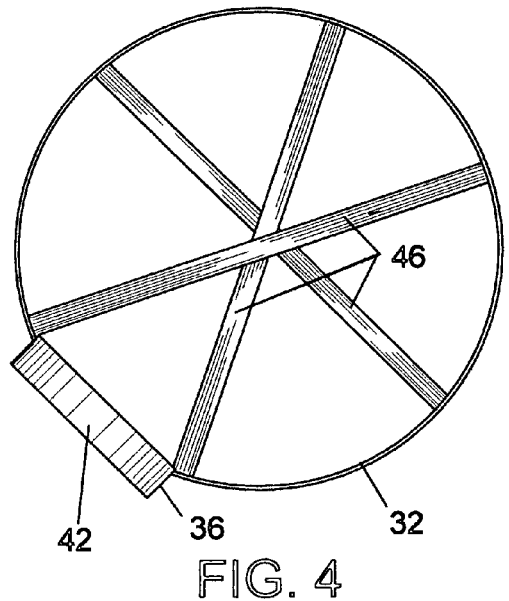
FIG. 4 illustrates a top plan view of a bed frame according to an embodiment of the invention.
Figure 5:
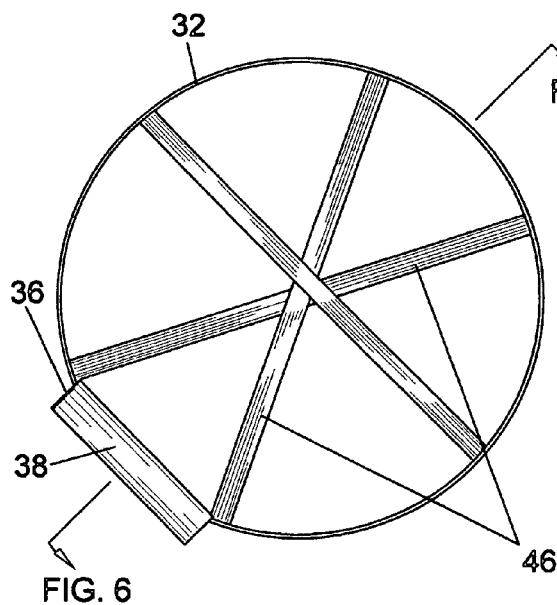
FIG. 5 illustrates a bottom plan view of a bed frame according to an embodiment of the invention.
Figure 6:
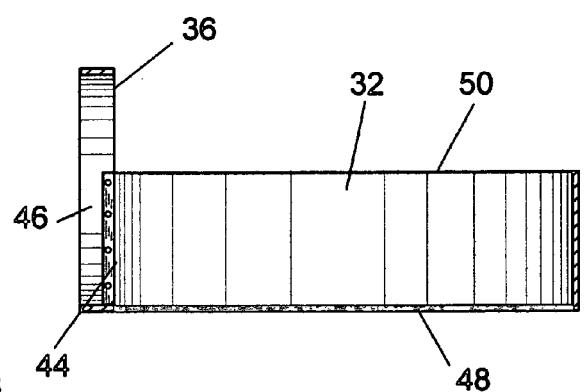
FIG. 6 illustrates a side cross-section elevation view of a bed frame according to an embodiment of the invention.

Referring to FIGS. 1 and 2, a pet bed 10 may have a wall 12, base 14 or bottom, an entrance 16 and a cover 18. A pet 120, such as a dog, may lie down on top of the cover 18 or may walk, crawl or creep through the entrance 16 and under the cover 18 to lie down in the pet bed 10 under the cover 18 that may rest on the pet 120. The pet bed 10 may have a circular, oval, rectangular, multisided or other suitable shape and may be sized for ease of use by pets of various sizes. The entrance 16 may be sized to allow a pet 120, such as a dog, cat or other animal, entry and may have a bow rectangular or other shaped upper portion 20.

Referring to FIGS. 3 through 6, a bed frame 30 may have a generally circular vertical side wall 32 with an open portion 34 in which a door frame 36 may be attached. The door frame 36 may have a horizontal threshold 38, generally vertical side frame members 40 and an arched upper frame member 42. The door frame 36 may be attached at an edge 44 to the side wall 32 by welding, riveting, removable fasteners, adhesive, material bonding, slidable engagement and the like depending on the material used to form the bed frame 30. Metal, plastic, composites or other suitable, generally rigid material may be used to form the bed frame 30 structure. Horizontal support elements 46, such as bars, may be attached adjacent the bottom edge 48. The support elements 48 may serve as cross members to maintain the shape of the bed frame 30 and the orientation of the side wall 32. There may also be a bottom plate or other structure attached adjacent the bottom edge 48 either with or without support elements 46.

Referring to FIGS. 7 through 9, a bottom cover assembly 60 and a top cover assembly 90 may be positioned on the bed frame 30. The bottom cover assembly 60 may have a generally circular bottom cover 62 with a side wall cover 66 attached at a peripheral edge 64. The side wall cover 66 may have a fold portion 68 to allow folding an upper side wall portion 70 over the top edge 50 of the side wall 32 for positioning against the inner surface 52 of the side wall 32.

The side wall cover 66 may have a side open portion 74 corresponding to open portion 34. A bottom pad 76 may be attached to the peripheral edge 64 in the side open portion 74 to allow positioning the bottom pad 76 interior to the side wall 32 to lie on the support elements 46 or bottom cover 62. A threshold cover 78 may be used to attach the bottom pad 76 and be positioned to cover the threshold 38. Top cover attachment tabs 80 may be attached to the threshold cover 78 positioned for placement against the side frame members 40.

In use, the bottom assembly cover 60 may have the bottom cover 62 positioned under the bottom edge 48 of the side wall 32 with the lower side wall portion 72 disposed against the outer surface 54 and the upper side wall portion 70 disposed against the inner surface 52. The side wall cover 66 may have a stiffener, springy material disposed therein, except in the fold portion 68, to aid in maintaining the side wall cover 66 in position. The bottom pad 76 may be inserted through the door frame 36 to be positioned in the pet bed 10 and to position the threshold cover 78 to cover the threshold 38.

The top cover assembly 90 may have a cover portion 92 with a bottom wall portion 94. There may be a door frame portion 96 formed in the top cover assembly 90 that is large enough to allow a pet 120 to enter or leave the pet bed 10 through the door frame 36. The bottom wall portion 94 may be positioned over the lower side wall portion 72. A drawstring 98, elastic band or like attachment device may be seamed in the bottom wall portion 94 lower edge 100 to be positioned under the bottom edge 48 of the side wall 32 to retain the top cover assembly 90. The cover portion 92 may be positioned to drape or rest interior to the side wall 32 to rest on the bottom pad 76 or on a pet 120.

The door frame portion 92 may have a door frame strip 102 of material to be positioned on the side frame members 40 and upper frame member 42. There may be a strip portion 104 for folding over the door frame 36 to be positioned against the interior surface 106 of the door frame 36. With the door frame strip 102 positioned on the door frame 36 the door frame portion 92 may drape downwardly relative to the upper frame member 42 to allow ease of entry of a pet 120 to move under the cover portion 92. The door frame strip 102 and top cover attachment tabs 80 may be attached to the door frame 36 or to each other by hook and loop material 108, snaps or like fastening devices.

The cover portion 92 or bottom pad 76 or both may have a heating element 110. The heating element 110 may have electric heating wires 112 positioned in the cover material and may be connectable to an electric power source.

The bottom cover assembly 60 may be constructed of a high density polyplastic material on the side wall cover 66. The material may allow the upper side wall portion 70 and lower side wall portion 72 to conform against the side wall 32 when the bottom cover assembly 60 is positioned on the bed frame 30. The bottom pad 76 may be constructed in three layers with a bottom of nylon 420 denier material, and intermediate element of foam or poly-Dacron batting material and a top of median weight cotton, cotton poly or polyester material. The strip portion 104 may be constructed of a high density polyplastic material to aid in conformance against the door frame 36. The other fabrics for the cover assemblies may be nylon of 420 denier or higher canvas, ultra suede, cotton-medium to heavy weight and like material.

The door frame 36 may have the side frame members 40 and upper frame members 42 slidably attached to the side wall 32 and the threshold 38. As best viewed in FIG. 9, the two side frame members 40 may each have a tongue 57 positioned to be slidably inserted in a wall curved flange 56 formed at the edges 44. The side frame ends 59 may be insertable in a threshold slot 58. This method of attachment may allow ease of installation and removal of the upper portion of the door frame 36 to present a lower vertical profile for the bed frame 30 to facilitate transport and storage of the pet bed 10.

While the invention has been particularly shown and described with respect to the illustrated embodiments thereof, it will be understood by those skilled in the art that the foregoing and other changes in form and details may be made therein without departing from the spirit and scope of the invention.

I claim:

1. A device for use by pets comprising:
    a bed frame having a side wall with an open portion with a door frame disposed and attached in said open portion;
    a bottom cover assembly having a bottom cover with a side wall cover attached at a peripheral edge wherein said side wall cover disposable on said side wall when said bottom cover is disposed under a bottom edge of said side wall;
    a bottom pad attached to said peripheral edge of said bottom cover at a side open portion of said side wall cover wherein said bottom pad disposed for insertion through said door frame when said bottom cover assembly is disposed on said bed frame;
    a top cover assembly having a cover portion with a bottom wall portion disposable on said side wall cover exterior to said side wall; and
    said top cover assembly having a door frame portion disposable at a door frame strip on said door frame.

2. The device as in claim 1 wherein said door framing having a threshold, two side frame members and an upper frame member.

3. The device as in claim 2 wherein each of said side frame members having a tongue disposed for slidable insertion in a wall curved flange formed at a wall edge, and a side frame end of each of said side frame members insertable in a threshold slot.

4. The device as in claim 1 wherein a support element is attached at a bottom edge of said side wall.

5. The device as in claim 1 wherein said bed frame is formed of metal.

6. The device as in claim 1 wherein said bed frame is formed of plastic.

7. The device as in claim 1 wherein said side wall cover comprising an upper side wall portion and a lower side wall portion with a fold portion therebetween wherein said lower side wall portion is disposable adjacent an outer surface of said side wall and said upper side wall portion is disposable adjacent an inner surface of said side wall when said fold portion is disposed over a top edge of said side wall.

8. The device as in claim 7 wherein said upper side wall portion and said lower side wall portion are constructed of a high density polyplastic material biased to conform to said side wall.

9. The device as in claim 1 wherein said bottom pad is attached to said peripheral edge by a threshold cover that is disposed over a threshold of said door frame when said bottom pad is disposed interior to said side wall.

10. The device as in claim 1 wherein a drawstring is seamed in a lower edge of said bottom wall portion.

11. The device as in claim 1 wherein said door frame strip having a strip portion disposable on an interior surface of said door frame.

12. The device as in claim 11 wherein said door frame strip and said strip portion are attached to said door frame by hook and loop material.

13. The device as in claim 11 wherein said strip portion is constructed of a high density polyplastic material biased to conform to said door frame.

14. The device as in claim 1 wherein said bottom pad is constructed with a bottom layer of nylon 420 denier material, an intermediate element of a foam batting, and a top layer cotton material.

15. A device for use by pets comprising:
    a bed frame having a side wall with an open portion with a door frame disposed and attached in said open portion;
    a bottom cover assembly having a bottom cover with a side wall cover attached at a peripheral edge wherein said side wall cover disposable on said side wall when said bottom cover is disposed under a bottom edge of said side wall;
    a bottom pad attached to said peripheral edge of said bottom cover at a side open portion of said side wall cover wherein said bottom pad disposed for insertion through said door frame when said bottom cover assembly is disposed on said bed frame;

a top cover assembly having a cover portion with a bottom wall portion disposable on said side wall cover exterior to said side wall; and said top cover assembly having a door frame portion disposable at a door frame strip on said door frame wherein said door frame strip having a strip portion disposable on an interior surface of said door frame and a threshold cover of said bottom cover assembly having a pair of top cover attachment tabs attachable to said door frame strip.

* * * * *